United States Patent [19]

Thom

[11] 3,810,010

[45] May 7, 1974

[54] PARTICLE ANALYSIS METHOD AND APPARATUS WHEREIN LIQUID CONTAINING PARTICLES IS SUCKED INTO A CONSTRICTED FLOW PATH

[75] Inventor: Reinhard Thom, Berlin-Dahlem, Germany

[73] Assignee: Telefunken Patentverwertungsgesellschaft m.b.H., Ulm/Donau, Germany

[22] Filed: Nov. 27, 1972

[21] Appl. No.: 309,662

Related U.S. Application Data

[63] Continuation of Ser. No. 872,893, Oct. 31, 1969, abandoned.

[30] Foreign Application Priority Data

Nov. 2, 1968 Germany.......................... 1806512

[52] U.S. Cl. ............................................ 324/71 CP
[51] Int. Cl. ......................................... G01n 27/06
[58] Field of Search .................. 324/71 R, 71 CP; 73/432 PS

[56] References Cited
UNITED STATES PATENTS

| | | | |
|---|---|---|---|
| 2,656,508 | 10/1953 | Coulter........................... | 324/71 CP |
| 2,985,830 | 5/1961 | Coulter et al................... | 324/71 CP |
| 3,299,354 | 1/1967 | Hogg............................... | 324/71 CP |

OTHER PUBLICATIONS

Spielman et al., Improving Resolution in Coulter Counting by Hydrodynamic Focusing, Journal of Colloid and Interface Sci. 26, pp. 125–182 (1968).

*Primary Examiner*—Gerard R. Strecker
*Attorney, Agent, or Firm*—Spencer & Kaye

[57] ABSTRACT

An apparatus for determining the relative quantities of different sized particles contained in a liquid, for example the relative number of red and white blood corpuscles, by measuring the electrical changes which occur as said particles pass through a capillary passage, is improved by providing a second capillary passage which directs the fluid medium containing the particles to be tested into the center of the first capillary passage.

17 Claims, 5 Drawing Figures

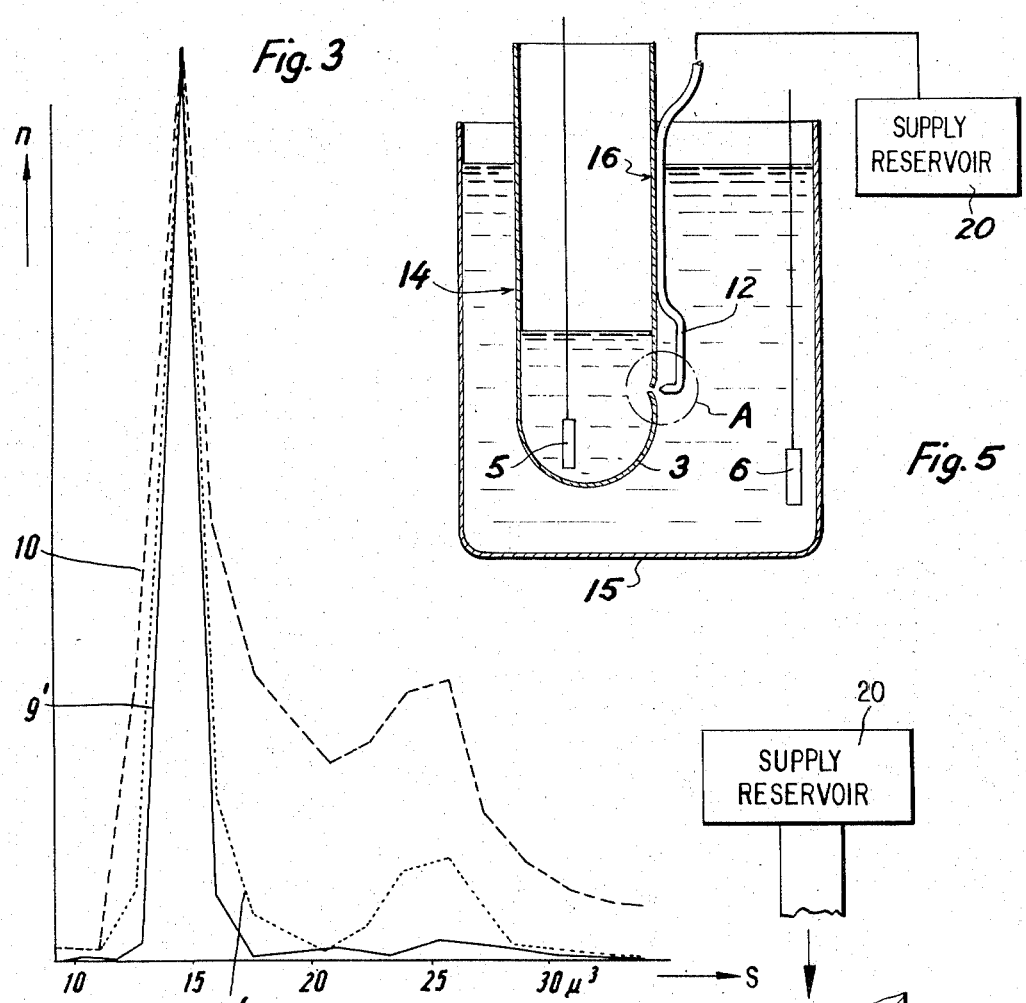

3,810,010

PARTICLE ANALYSIS METHOD AND APPARATUS WHEREIN LIQUID CONTAINING PARTICLES IS SUCKED INTO A CONSTRICTED FLOW PATH

CROSS REFERENCE TO RELATED APPLICATION

This application is a continuation of application Ser. No. 872,893, filed Oct. 31, 1969, and now abandoned.

BACKGROUND OF THE INVENTION

This invention relates to testing apparatus, and more particularly to apparatus for determining the relative quantity of different sized particles present in a fluid suspension.

U.S. Pat. No. 2,656,508, issued to Wallace H. Coulter discloses apparatus for deriving values which correspond to the quantities of different sized particles in a liquid to be tested. In this apparatus two vessels are connected by a capillary passage. Since the liquid level in one vessel is much higher than that of the other a constant fluid flow occurs between the vessels. An electrode is provided in each vessel and a voltage source is connected between the electrodes. The current flowing between the electrodes depends essentially upon the ion flow occuring through the capillary passage, and is changed when particles such as red or white blood corpuscles pass through the capillary passage. By analyzing the individual pulses reflecting such current changes it is possible to determine the relative quantities of the different sized particles.

It has been determined that the readings obtained by this instrument are not as exact as desired. One reason for this is that particles which pass through the capillary passage near the walls instead of near the center may cause misleading electrical current changes.

Among the objects of the present invention is the provision of a test apparatus which provides increased accuracy in the determination of the quantity of different sized particles present in a liquid suspension to be tested.

These and other objects of the invention are achieved by providing a second capillary passage which is positioned so as to direct the liquid suspension containing the particle to be tested into the approximate center of the first capillary passage.

BRIEF DESCRIPTION OF THE DRAWINGS

FIG. 3 is a graph similar to FIG. 2 showing the distribution pattern which occurs in actual cases.

FIG. 4 is a sectional view taken through the capillary passages of a testing arrangement according to the present invention.

FIG. 5 illustrates somewhat schematically the mounting of the second capillary according to the present invention.

DESCRIPTION OF PREFERRED EMBODIMENTS

Figure 1:
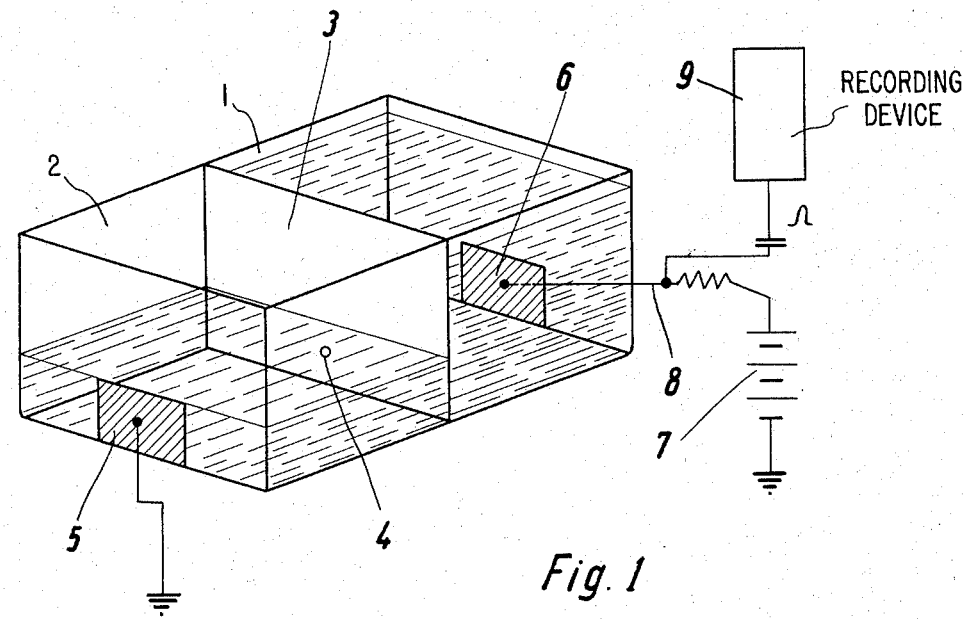
FIG. 1 is a perspective view illustrating somewhat schematically a testing arrangement in accordance with the present invention.

Referring now to FIG. 1 a testing arrangement according to both the prior art and the present invention includes a first vessel 1 and a second vessel 2 which are separated from each other by a partition 3. The vessels and the partition are made of glass or some other electrically non-conductive material.

A capillary passage 4 is formed in partition 3. Normally the fluid level within the first vessel is kept at a much higher level than that in the second vessel 2. As a result there is a constant flow of liquid from the first vessel to the second vessel.

In each vessel there is disposed an electrode 5 or 6. The two electrodes 5 and 6 are connected to a d.c. voltage source 7 through ground and through a line 8. As a result an ion current constantly flows between the two electrodes if the liquid in the two vessels is an electrolyte. The magnitude of this current depends upon the size of the capillary opening 4.

If the liquid contains particles suspended therein whose size is significant with respect to the size of opening 4 the conductivity between the electrodes 5 and 6, and thus the current flowing in the line 8 is changed when such a particle passes through the capillary opening 4. In order to measure the intensity of pulses which appear when a particle passes through a capillary opening 4, and the quantity of such pulses a recording device 9 is connected to line 8. Recording device 9 is a multichannel pulse amplitude analyzer which registers the number of pulses appearing at its input in dependence on the amplitude of the respective pulse. At the end of each measuring cycle a series of numbers may be read out of the pulse amplitude analyzer which corresponds to the number of pulses received in certain amplitude ranges. The details of this multi-channel analyzer are not pertinent for purposes of the present invention and any of the analyzers developed for use with respect to the apparatus disclosed in the previously mentioned U.S. Pat. No. 2,656,508 may be used.

The structure, as described to this point, is substantially similar to that of the prior art device described in U.S. Pat. No. 2,656,508.

The improved structure according to the present invention is shown in greater detail in FIG. 4. Partition 3 is formed with a large opening into which a first capillary member 11 having capillary passage 4 formed therein is placed. The first capillary passage 4 has a length $L_1$. Immediately before passage 4 is a funnel shaped portion of length $L_2$. The funnel surface is paraboloidal and the edges of the capillary passage 4 are rounded in the region of narrowest diameter. The funnel opening has its largest diameter $d_4$ on its inlet end, which is the right side as seen in FIG. 4.

At a small distance $L_3$ from the inlet portion of capillary opening 4 there is positioned a second capillary 12. Capillary 12 is a tube which is connected to a supply reservoir 20 for a liquid containing suspended particles of different sizes therein. The interior of capillary tube 12 tapes in the manner of a funnel, and has a diameter $d_3$ of approximately $50\mu$ at the outlet opening. Tube 12 has an external diameter $d_5$ and an internal diamteter $d_6$. The interior surface of the second tube 12 is positioned so that its axis at its outlet opening is co-axial with the axis of capillary opening 4. The interior of tube 12 has a silicone coating 13 thereon. This reduces the surface tension between capillary 12 and the liquid contained therein.

If the testing apparatus is intended to test a liquid having particles suspended therein of a size of in the range of 5 to 5,000 cubic microns the capillary opening 4 may have the dimensions as follows: smallest diameter, $d_1$, 70 microns (hereafter $\mu$ ). The length of the capillary portion $L_1$, is 70 $\mu$. the diameter $d_2$ of the inlet opening portion of passage 4 at the outlet of the funnel portion is approximately 85 $\mu$. The funnel portion of length $L_2$ of first capillary member 11 is approximately 150 $\mu$ and has an inlet diameter $d_4$ of approximately 1,000 $\mu$. The inside diameter $d_6$ of capillary tube 12 is approximately 500 $\mu$ and tapers in the manner of a funnel having an outlet opening $d_3$ of approximately 50 $\mu$. The outside diameter $d_5$ of capillary tube 12 is approximately 1,300 $\mu$ and tapers paraboloidally in accordance with the funnel surface of first capillary member 11. The distance $L_3$ between the outlet of capillary 12 and the inlet of capillary 4 is approximately 50 $\mu$. If the capillary tubes are too close together flow through opening 4 will be cut off. In that case, recording device 9 will show that no current is flowing between the electrodes 5 and 6. If the capillaries are too far apart particles will pass through the capillary in only insignificant quantities. This will also be indicated by the recording device 9. It will be noted that $L_3$, $d_1$, and $d_3$ are all of the same order of magnitude.

An assembly containing the elements of FIG. 4 and according to the invention is shown in FIG. 5. The recording device and the voltage source for the electrodes are left out, because these can be developed in a well known method. Here the partition 3 is formed by a vessel, in which the capillary member 11 is fitted as shown in FIG. 4. This is indicated by the circle A in which the components described in FIG. 4 are supposed to be. The liquid flows from the vessel 15 through the capillary passage 4 (FIG. 4) into the vessel which is formed by the partition 3. The capillary tube 12 is bended so that it touches the partition 3, formed as a vessel, at the place 16. Here the capillary tube 12 is firmly connected with the partition 3 by pasting or fusing. Fusing especially comes into question when the partition 3 and the capillary tube 12 are made from glass. To find out the right position of the capillaries to each other a needle preferably shouldered down twice with the diameters $d_1$ and $d_3$ may be led from the left side into the capillary opening 4 and the outlet opening of capillary tube 12 during pasting or fusing, whereby the coaxial position of the capillaries is achieved. By means of a taper form of the needle or by means of convenient distances between the shoulders of the needle it can be achieved that the axial distance of the capillaries to each other is fixed too during pasting or fusing. After pasting or fusing the needle will be removed. A hole in the partition 3 which perhaps has been planned for the lead-in of the needle at the place 14 can be shut afterwards.

Figure 2:
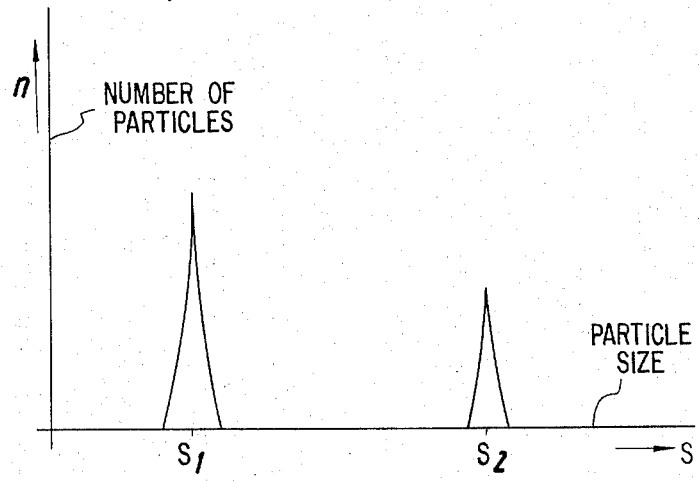
FIG. 2 is a graph showing the size distribution of two different particles suspended in a fluid as it would ideally appear.

The effect of the improvement, and the deficiencies of the prior art, can be appreciated by examination of the graphs shown FIGS. 2 and 3. These graphs show the size of particles passed on the horizontal scale, and the quantity of particles of particular sizes passed on the vertical scale. As actually measured in recording device 9 size will be indicated by current measurements and quantity by the number of peaks of particular current variations noted. However, a scale showing particular sizes corresponding to the current noted is indicated in FIG. 3 for convenience.

If an exact measurement were made of particles of two different sizes a curved path of the type illustrated in FIG. 2 would result. This curve indicates that a relatively high number n of particles of $S_1$ passed through the capillary opening 4 and that a somewhat smaller number of particles of size $S_2$ passed through the opening. The curve also shows a bell shaped distribution of particles of about the average size $S_1$ and $S_2$ of each of the two different sizes.

However, experiments have been performed which show that the current changes indicated by the known measuring arrangement does not correspond to the actual sizes with sufficient exactness. If for example polyvinyl toluol latex is added to a liquid it is known that different sized particles will be formed, and that the actual distribution of particles of different sizes will be as shown in the solid line curve 9' of FIG. 3. However, if the liquid is tested with the apparatus of the prior art as shown in FIG. 1 a curve 10 as shown in dashed lines is obtained. This deviates substantially from the actual size distribution curve 9'. This deviation is particularly strong to the right of the maximum point of the ideal curve 9'. A second largely erroneous maximum point is shown to the right of the true maximum point of the ideal curve. This erroneous maximum can be explained by simultaneous passage of two particles through the capillary passage.

It will be appreciated that this strong deviation to the right of the maximum of the ideal curve represents a problem. It has been found that if the improvement as shown in FIG. 4, is used a curve 14' as shown in dotted lines in FIG. 3 results. It would appear that one reason for the improvement would be the fact that the particles are fed generally into the center of the flow path through the opening 4, where the electric field is approximately homogeneous.

The departure of the curve path 10 from the ideal curve path 9' with the prior art apparatus depends on the particle size, on the ratio of particle size to diameter of the opening, the distance of the particles from the walls, the flow-through speed, and the length of capillary passage, as well as the plasticity of the particles.

Detailed experiments have shown that the erroneous path of curve 9' of FIG. 3 to the right of the maximum is, except for the second maximum, caused by particles passing through the capillary opening near the walls thereof. This is caused by the fact that the electric field is more concentrated near the walls so that particles passing through the capillary opening near the walls cause a disturbance with more electric field lines and thus an increase in the pulse.

As a result of the present improvement particles move almost exclusively in the center of a liquid stream passing through capillary opening 4. In this center the electric field is approximately homogeneous. The liquid stream flowing from the first vessel 1 to the second vessel 2 in effect sucks the liquid from the second capillary tube 12 and moves it and also the particles contained in it in the center of the liquid stream through the first capillary tube 11, i.e., the liquid is sucked out of the tube 12 and the liquid together with the particles contained in it are injected directly into the center of the liquid stream through the tube 11, as shown in the drawing. In this arrangement a second erroneous maximum is also produced by the simultaneous passage of two particles through capillary opening 4. However the magnitude of this erroneous maximum is substantially less.

An additional improvement in the measuring accuracy results from the fact that the edges of capillary opening 4 are rounded. A further improvement results from the fact that capillary passages 4 and 12 are each of funnel shape through a portion of their axial length extending from an inlet side which is larger to an outlet which has a narrower diameter. Preferably the walls of the funnel portion should be approximately paraboloidal. It has also been shown to be advisable to make the outlet opening of capillary tube 12 approximately two-thirds as large as the inlet opening of capillary passage 4. The distance between the outlet opening of the second capillary passage 12 and the inlet of the first capillary passage 4 should be selected so that it is small enough so that the above-mentioned suction effect occurs. It is also desirable to construct the interior of second capillary passage 12 so that it narrows in the manner of a funnel toward its outlet opening.

The relationship between the capillary passage diameters and the diameter of the particles to be tested should be selected so that the passage of the particles produces a measureable change in conductivity on one hand, and on the other hand, the particles pass through the capillary tube without difficulties.

It will be understood that the above description of the present invention is susceptible to various modifications, changes and adaptations, and the same are intended to be comprehended within the meaning and range of equivalents of the appended claims.

I claim:

1. In an arrangement for deriving values corresponding to the quantities of different size particles contained in a liquid to be tested, which arrangement comprises, in combination:
   a. a first vessel for holding liquid,
   b. a second vessel for holding liquid,
   c. means including a first capillary tube connected to each of said vessels for causing a flow of liquids from the first vessel to the second vessel,
   d. electrode means in each vessel,
   e. means for applying a voltage across said electrodes so that ion movement caused by the voltage across the electrodes occurs through said first capillary tube, and
   f. current measuring means for detecting temporary changes in the current between the electrodes with respect to its amplitude and for indicating the number of current changes separately according to amplitudes, the improvement which comprises:
   g. a second capillary tube for supplying a liquid having the different size particles to be tested suspended therein, said second capillary tube having an opening positioned co-axially with said first capillary tube, the distance between the outlet opening of said second capillary tube and the inlet of said first capillary tube being such that flow of liquids from the first vessel to the second vessel sucks liquid out of said second capillary tube and injects it directly into said first capillary tube, whereby values corresponding to quantities of different size particles contained in the liquid sucked from said second capillary tube may be determined.

2. The improvement defined in claim 1, wherein the opening of said first capillary tube into which the said liquid stream from the second capillary tube enters has rounded edges.

3. The improvement of claim 1, wherein said first capillary tube has a funnel shape starting at the inlet opening and extending over at least a portion of its axial length.

4. The improvement defined in claim 3, wherein said funnel walls are of substantially paraboloidal shape.

5. The improvement defined in claim 1, wherein the opening of said second capillary tube is approximately two-thirds the size of the opening of said first capillary tube.

6. The improvement defined in claim 1, wherein said second capillary passage narrows in the direction towards its outlet opening in the form of a funnel.

7. The improvement defined in claim 1, wherein the inner surface of said second capillary passage is provided with a coating which reduces the surface tension between said passage and said liquid.

8. The improvement defined in claim 7, wherein said coating is silicone.

9. The improvement defined in claim 1, wherein said first capillary tube is formed in a partition separating said first and second vessels and has a funnel shaped portion of substantially paraboloidal shape extending from said first vessel through a portion of its axial length to a minimum diameter portion having rounded edges leading to said second vessel, and wherein the interior of said second capillary tube has a silicone coating and narrows in the direction towards its outlet opening in the form of a funnel.

10. In an arrangement for studying the physical properties of particles suspended in a fluid medium of different conductivity than the particles, which arrangement comprises:
    a. means for holding a quantity of the fluid medium,
    b. means defining a constricted flow path for the fluid with the particles suspended therein,
    c. means for producing an electrical field and an electrical current along said constricted flow path and
    d. means for detecting changes in said electrical current caused by passage of suspended particles through said constricted flow path,
    the improvement comprising means for sucking a quantity of the fluid medium containing the particles to be tested into that area of said constricted flow path, in which area said electrical field is approximately homogeneous.

11. In an arrangement for studying the physical properties of particles suspended in a fluid medium of different conductivity than the particles, which arrangement comprises:
    a. means for holding a quantity of the fluid medium,
    b. means defining a constricted flow path for the fluid with the particles suspended therein,
    c. means for producing an electrical current along said constricted flow path and
    d. means for detecting changes in said electrical current caused by passage of suspended particles through said constricted flow path,
    the improvement comprising means for sucking a quantity of the fluid medium containing the particles to be tested into the center of said constricted flow path.

12. In an arrangement for deriving values corresponding to the quantities of different size particles contained in a liquid to be tested, which arrangement comprises, in combination:
- a. a first vessel for holding liquid,
- b. a second vessel for holding liquid,
- c. means including a first capillary tube connected to each of said vessels for causing a flow of liquids from the first vessel to the second vessel,
- d. electrode means in each vessel,
- e. means for applying a voltage across said electrodes so that an electric field caused by the voltage across the electrodes makes ions move through said first capillary tube, and f. current measuring means for detecting temporary changes in the current between the electrode with respect to its amplitude and for indicating the number of current changes separately according to amplitudes, the improvement which comprises:
- g. a second capillary tube for supplying a liquid having the different size particles to be tested suspended therein, said second capillary tube having an opening positioned co-axially with said first capillary tube, the distance between the outlet opening of said second capillary tube and the inlet of said first capillary tube being such that flow of liquids from the first vessel to the second vessel sucks liquid out of said second capillary tube and injects it directly into said first tube as a stream flowing through that area of said first tube, in which area said electric field is approximately homogeneous.

13. The method of using an arrangement for deriving values corresponding to the quantities of different size particles contained in a liquid to be tested, which arrangement comprises, in combination:
- a. a first vessel for holding liquid,
- b. a second vessel for holding liquid,
- c. means including a first capillary tube connected to each of said vessels for causing a flow of liquids from the first vessel to the second vessel,
- d. electrode means in each vessel,
- e. means for applying a voltage across said electrodes so that ion movement caused by the voltage across the electrodes occurs through said first capillary tube,
- f. current measuring means for detecting temporary changes in the current between the electrodes with respect to its amplitude and for indicating the number of current changes separately according to amplitudes, and
- g. a second capillary tube for supplying a liquid having the different size particles to be tested suspended therein, said second capillary tube having an opening positioned co-axially with said first capillary tube, the distance between the outlet opening of said second capillary tube and the inlet of said first capillary tube being such that the flow of liquids from the first vessel to the second vessel sucks liquid out of said second capillary tube and injects it directly into said first capillary tube, whereby values corresponding to quantities of different size particles contained in the liquid sucked from said second capillary tube may be determined, which method comprises the steps of placing electrolyte in said second vessel, placing particle-free electrolyte in said first vessel, placing particle-containing liquid in said second capillary tube, and sucking particle-containing liquid out of said second capillary tube and injecting it directly into said first capillary tube by flowing said particle-free electrolyte from said first vessel through said first capillary tube itnto said second vessel.

14. An arrangement as claimed in claim 1, wherein said outlet opening has a diameter of 50 microns, said inlet has a smallest diameter of 70 microns, and said distance is 50 microns.

15. An arrangement as claimed in claim 1, wherein said distance, the diameter of said outlet opening, and the smallest diameter of said inlet are all of the same order of magnitude.

16. The method of using an arrangement as claimed in claim 13, wherein said outlet opening has a diameter of 50 microns, said inlet has a smallest diameter of 70 microns, and said distance is 50 microns.

17. The method of using an arrangement as claimed in claim 13, wherein said distance, the diameter of said outlet opening, and the smallest diameter of said inlet are all of the same order of magnitude.

* * * * *